(12) United States Patent
Keller

(10) Patent No.: US 7,168,910 B2
(45) Date of Patent: Jan. 30, 2007

(54) DEVICE FOR TRANSPORTING A HORIZONTAL STACK POSITIONED ON A SUPPORT AND FORMED IN A GATHERING MACHINE WITH UPRIGHT, LINED-UP SIGNATURES

(75) Inventor: Christof Keller, Zofingen (CH)

(73) Assignee: Muller Martini Holding AG, Hergiswil (CH)

( * ) Notice: Subject to any disclaimer, the term of this patent is extended or adjusted under 35 U.S.C. 154(b) by 0 days.

(21) Appl. No.: 10/609,372

(22) Filed: Jul. 1, 2003

(65) Prior Publication Data

US 2004/0096309 A1    May 20, 2004

(30) Foreign Application Priority Data

Jul. 2, 2002   (EP)   ................... 02405554

(51) Int. Cl.
B65G 57/22 (2006.01)

(52) U.S. Cl. ............... 414/791.6; 414/792.6; 414/792.9; 414/907; 901/16

(58) Field of Classification Search ............ 414/791.6, 414/792.6, 792.9, 907; 901/16
See application file for complete search history.

(56) References Cited

U.S. PATENT DOCUMENTS

| | | | |
|---|---|---|---|
| 3,076,673 A * | 2/1963 | Kaplan et al. ........... | 294/67.33 |
| 4,083,461 A * | 4/1978 | Wangermann .......... | 414/792.9 |
| 4,419,035 A | 12/1983 | Stobb | |
| 4,519,740 A * | 5/1985 | Stobb ...................... | 414/791.6 |
| 4,591,198 A * | 5/1986 | Monforte ...................... | 294/88 |
| 4,658,715 A * | 4/1987 | Stobb ............................. | 100/2 |
| 4,674,934 A | 6/1987 | Honger | |
| 4,984,963 A * | 1/1991 | Bon ........................ | 414/789.5 |
| 5,087,169 A * | 2/1992 | Tubke .................... | 414/792.9 |
| 5,098,254 A * | 3/1992 | Becicka et al. .......... | 414/792.9 |
| 5,102,292 A * | 4/1992 | Brinker et al. .............. | 414/796 |
| 5,169,284 A * | 12/1992 | Berger et al. ............ | 414/796.9 |
| 5,312,222 A * | 5/1994 | Neri et al. .................. | 414/788 |
| 5,391,050 A * | 2/1995 | Gatteschi ..................... | 414/796 |
| 5,564,893 A * | 10/1996 | Tacchi et al. ............ | 414/796.9 |
| 5,674,049 A * | 10/1997 | Pienta et al. ............. | 414/798.7 |
| 6,264,419 B1 * | 7/2001 | Schinzel .................. | 414/751.1 |
| 6,315,516 B1 * | 11/2001 | Schneider et al. ....... | 414/790.4 |

FOREIGN PATENT DOCUMENTS

| | | |
|---|---|---|
| EP | 0339002 A2 | 10/1989 |
| EP | 0623542 A1 | 11/1994 |
| EP | 1199275 A1 | 4/2002 |
| JP | 08113210 | 5/1996 |

OTHER PUBLICATIONS

Müller Martini, "Bundling Machine 327—For efficient post-press automation", brochure.

* cited by examiner

*Primary Examiner*—Douglas Hess
(74) *Attorney, Agent, or Firm*—Venable LLP; Robert Kinberg; Henry J. Daley

(57) ABSTRACT

A device is used for transporting a horizontal stack from a stack support to an intermediate deposit, where the stack is formed in a gathering device with upright, lined-up signatures. The device is comprised of a horizontally and vertically displaceable clamp arranged above the stack support, wherein the clamp compresses the stack at the ends and transfers a strapped stack from the stack support to an adjacent intermediate deposit.

2 Claims, 2 Drawing Sheets

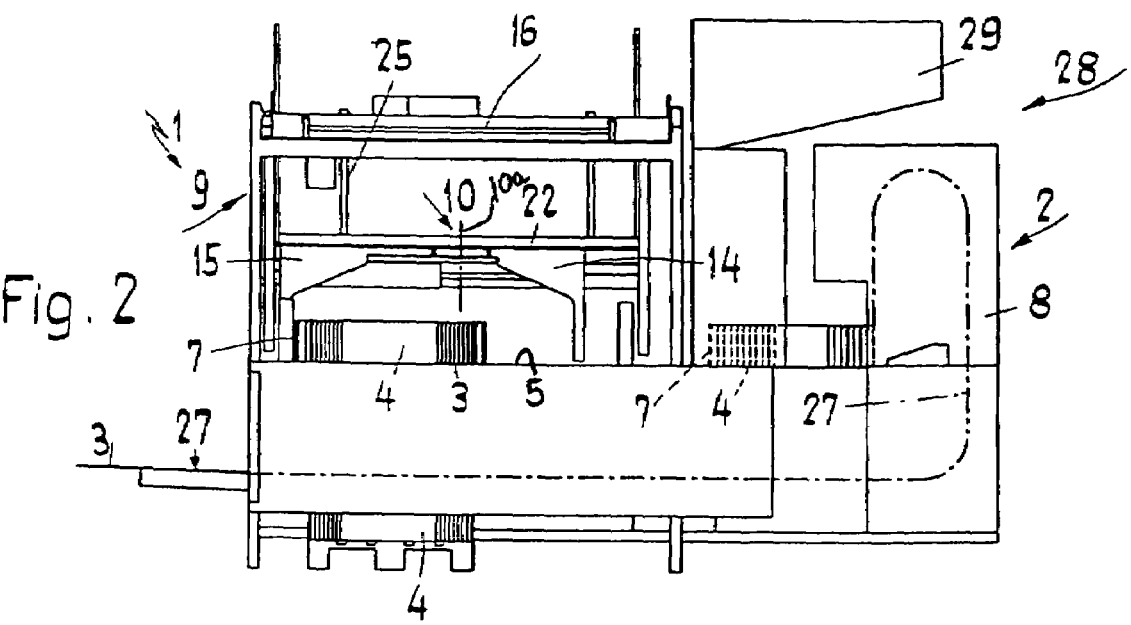
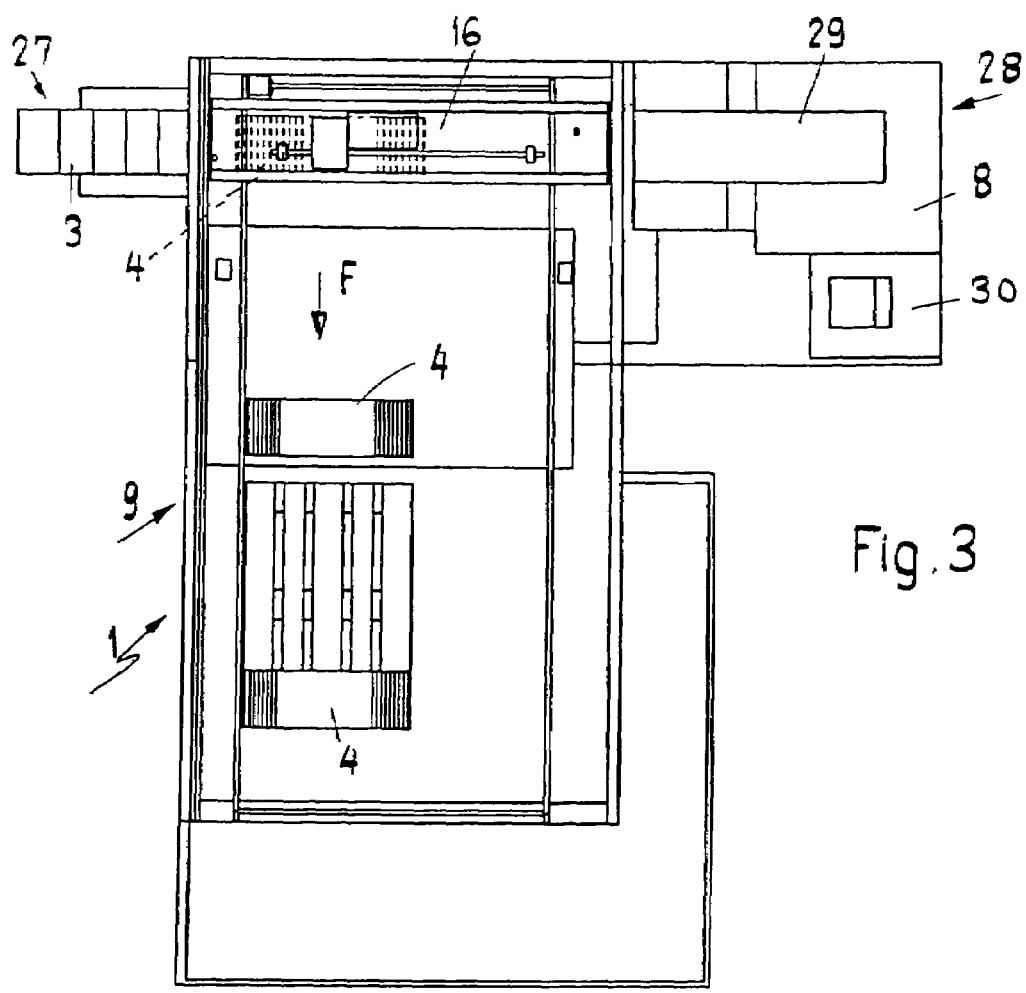

DEVICE FOR TRANSPORTING A HORIZONTAL STACK POSITIONED ON A SUPPORT AND FORMED IN A GATHERING MACHINE WITH UPRIGHT, LINED-UP SIGNATURES

BACKGROUND OF THE INVENTION

1. Field of the Invention

The invention relates to a device for transporting a horizontal stack that is formed in a gathering machine with upright, lined-up signatures from a stack support to an intermediate deposit.

2. Related Art

Devices for transporting a horizontal stack formed in a gathering machine are used for removing stacks from so-called bundling machines, as described, for example, in references EP 0 623 542 A1 and EP 1 199 275 A1.

The Müller Martini brochure 327.889 shows a known method of removing stacks from a bundling machine 327. The horizontal stacks, produced on the bundling machine with upright, lined-up signatures, are gathered and/or collected on a support and are then compressed and strapped. The finished bundles and/or stacks are subsequently displaced manually from the support to the side via a roller table and are then picked up by a crane and deposited on pallets.

The same brochure also shows an embodiment having an automatic palletizer that adjoins the roller table.

With installations of this type, the signatures are gathered into a loose stack, compressed at the conveying end of the stack support, strapped and then picked up outside of the strapping station by a lifting device.

A clamp is consequently needed for the compressing and strapping operations in the bundling machine and another clamp is needed for transporting the strapped stack to the intermediate deposit.

SUMMARY OF THE INVENTION

In an exemplary embodiment of the present invention, a device for transporting a horizontal stack positioned on a support and formed in a gathering machine with upright, lined-up signatures is disclosed.

It is the object of an embodiment of the present invention to create a device of the aforementioned type, which makes it possible to avoid multiple expenditures.

This object is solved according to an exemplary embodiment of the invention by arranging a horizontally and vertically displaceable clamp above the stack support, which compresses the stack at the ends and transfers a strapped stack from the stack support to the adjacent intermediate deposit.

The embodiment according to the proposed solution makes it possible to strap a stack while it is positioned on the stack support or next to it.

The device according to the invention can be operated on the right as well as the left side of the stack support, viewed in the signature conveying direction, thus allowing the transport toward both sides.

With the device according to the invention, the stack can be transported automatically and computer-controlled from the stack support to the intermediate deposit, without requiring any personnel.

In an exemplary embodiment, the invention can be a device for transporting a horizontal stack, the stack formed in a gathering device with upright, lined-up signatures, from a stack support to an intermediate deposit, the device comprising: a horizontally and vertically displaceable clamp arranged above the stack support, wherein the clamp compresses the stack at the ends and transfers a strapped stack from the stack support to an adjacent intermediate deposit.

In another exemplary embodiment, the invention can be a device for transporting a horizontal stack, formed in a gathering device with upright, lined-up signatures, from a stack support to an intermediate deposit, the device comprising: a horizontally and vertically movable clamp arranged above the stack support, wherein the clamp compresses the stack at the ends and transfers the stack from the stack support via an adjacent strapping station to a following intermediate deposit.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

FIG. 2 depicts a view from the side of the device shown in FIG. 1; and

FIG. 3 depicts a basic outline of the device shown in FIG. 2.

DETAILED DESCRIPTION OF AN EXEMPLARY EMBODIMENT OF THE PRESENT INVENTION

Figure 1:
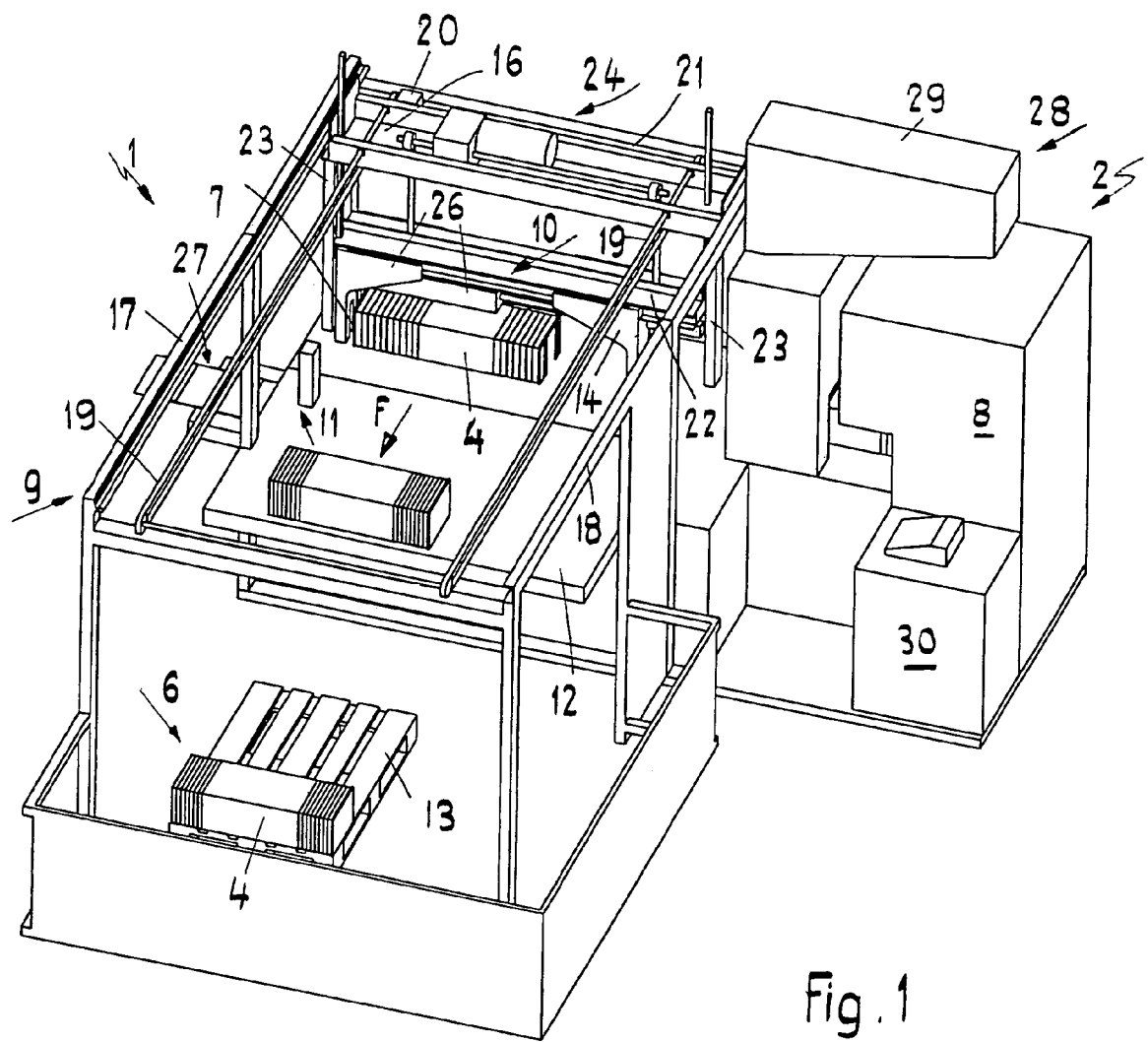
FIG. 1 depicts an exemplary embodiment of a three-dimensional representation of the device invention according to the present invention.

A preferred embodiment of the invention is discussed in detail below.

While specific exemplary embodiments are discussed, it should be understood that this is done for illustration purposes only. A person skilled in the relevant art will recognize that other components and configurations can be used without parting from the spirit and scope of the invention.

FIGS. 1 to 3 illustrate a device 1 for transporting stacks 4, formed in a gathering machine 2 with upright, lined-up signatures 3, from a stack support 5 to an intermediate deposit 6. Along this path, the signatures 3 are compressed perpendicularly to the stack formation direction and are then strapped.

Prior to this operation, the signatures are fed in a scaled formation, as disclosed in EP 1 199 275 A1, and via a reversing device 8 to the stack support 5. There, the signatures are lined up while resting on their spines against an advancing front support element 7, until a second support element marks the end of the stack 4 in the back. The loosely gathered stack 4 then reaches its end position on the stack support 5. This sequence is illustrated in FIGS. 1 to 3.

A clamp 10 that can traverse along a support frame 9 is provided above the stack support 5 for transferring the stack 4, which can be strapped while on the stack support 5. The clamp compresses the stack 4 at the ends, lifts the stack off the stack support 5 and moves the stack to an adjacent strapping station 11, where the stack is strapped with a band (not shown) and moved to a delivery table 12 or to the intermediate deposit 6. The intermediate deposit 6 comprises a pallet 13 on which the stacks 4 are deposited side-by-side or one above the other. A lifting platform or forklift is used for the further transport. A loading cart can also be made available in place of one or several pallets 13. The clamp 10, which may include two clamping jaws 14, 15, can be moved with the aid of a bridge support 16 that is arranged so as to traverse along a support frame transverse to its longitudinal direction, in a first conveying direction F, from the stack support 5 to the intermediate deposit 6. As previously mentioned, the intermediate deposit 6 can be embodied as automatic palletizer. The clamp 10 is thus arranged on the bridge support 16 in such a way that it can be displaced transverse to the first conveying direction F.

The clamp 10 is designed to swivel around a vertical swiveling post 10a, such that the stacks 4 can be deposited crosswise in the intermediate deposit 6.

The bridge support 16 is provided with rollers (not shown) at the ends, which are positioned so as to roll off side-mounted roller surfaces 17, 18. The bridge support 16 is connected to two circulating traction means 19, driven parallel to the first conveying direction F by an electric motor 20 that is attached to the support frame 9. A joint drive shaft 21 is provided for transferring a uniform rotational movement to both traction means 19 with the aid of pulleys, around which a toothed belt circulates.

The clamping jaws 14, 15 of clamp 10 in turn are attached so as to be adjustable to a support 22 that is height adjustable below the bridge support 16. Therefore, the support 22 can be guided along vertical extension arms 23 that are attached to the bridge support 16. The support 22 is lowered and raised with a winch-type hoist 24, which is mounted on the bridge support 16. A shaft encoder controls the height adjustment of clamp 10 while the traction belts 25 are provided as holding elements.

The clamp 10 is operated with a piston-cylinder unit 26 that is mounted on the support 22. That is to say, the immovable clamping jaw 15 is oriented toward the front end of the stack 4, so that the clamp 10 is then opened up with the aid of a clamping jaw 14. However, this does not preclude the option of changing the position of the immovable clamping jaw 15.

The mode of operation for device 1 alternatively allows the clamp 10 to pick up the stack 4 from the stack support 5 in different positions and to deposit the stack in the intermediate deposit 6 with a relative offset to the pick-up position. Thus, it makes sense if both clamping jaws 14, 15 of the clamp 10 can be operated separately, meaning a piston-cylinder unit is assigned to each clamping jaw 14, 15, but these are operated jointly. It is advantageous if the clamping jaws 14, 15 are oriented approximately symmetrically toward the stack 4 or if the position of stack 4 is detected and the clamping jaws are controlled accordingly.

According to another option, the clamping jaws 14, 15 can also be operated with a rack-and-pinion drive that is mounted on the support 22. For this, a gearwheel arranged between the clamping jaws 14, 15, for example, acts upon two opposite arranged gear rods that are connected to respectively one clamping jaw 14, 15.

FIGS. 1 to 3 furthermore show a bundling machine, also called a gathering device 2, in a schematic arrangement relative to the device 1, to which a scaled flow 27 of signatures 3 is supplied undershot. The signatures are fed from a printing machine (not shown) to a bundling machine where they are reversed on the opposite side via a reversing device 8. Following the reversing device 8, the reversed scaled flow 27 empties onto a stack support 5 on which a horizontal stack 4 is generated with signatures 3 positioned on the spine. FIGS. 1 and 2 show at this point an incomplete stack 4 at a board-insertion station 28, which respectively provides one board for the front end and the back end of a stack 4. The reference number 29 refers to a board magazine that supplies the boards. As previously mentioned, exemplary embodiments are shown in references EP 0 623 542 A1 and EP 1 199 275 A1. The present device 1 is configured such that it can be installed as fully automatic machine behind a printing machine.

Reference number 30 in FIGS. 1 and 3 indicates a control unit for the gathering and transporting device.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A device for transporting a horizontal stack, the stack formed in a gathering device with upright, lined-up signatures, from a stack support to an intermediate deposit, the device comprising:
   a clamp arranged above the stack support, wherein the clamp functions to compress the stack to be strapped and wherein said clamp can be moved in horizontal and vertical directions and is constructed to transport the strapped stack from the stack support to an intermediate deposit,
   wherein the clamp comprises two clamping jaws, and the device further comprises a support frame wherein the clamp can be displaced along the support frame in a first conveying direction from the stack support to the intermediate deposit, further comprising a movable bridge support,
   wherein the clamp is suspended from the movable bridge support and can be displaced transversely to the first conveying direction along the movable bridge support,
   wherein the ends of the movable bridge support are provided with roller supports, which are connected to the support frame, and wherein the movable bridge support is operatively connected to at least one endlessly circulating traction means, further comprising: two traction means for moving the movable bridge support along the roller supports; and a motor having a joint drive shaft attached to the support frame, wherein the traction means are toothed belts, which are operatively connected via the joint drive shaft.

2. A device for transporting a horizontal stack, formed in a gathering device with upright, lined-up signatures, from a stack support to an intermediate deposit, the device comprising:

a clamp arranged above the stack support, wherein the clamp functions to compress the stack to be strapped and wherein said clamp can be moved in horizontal and vertical directions and is constructed to transport the strapped stack from the stack support via an adjacent strapping station to a following intermediate deposit.

wherein the clamp comprises two clamping jaws, and the device further comprises a support frame wherein the clamp can be displaced along the support frame in a first conveying direction from the stack support to the intermediate deposit, further comprising a movable bridge support, wherein the clamp is suspended from the movable bridge support and can be displaced transversely to the first conveying direction along the movable bridge support, wherein ends of the movable bridge support are provided with roller supports, which are connected to the support frame, and wherein the movable bridge support is operatively connected to at least one endlessly circulating traction means, further comprising: two traction means for moving the movable bridge support along the roller supports; and a motor having a joint drive shaft attached to the support frame, wherein the traction means are toothed belts, which are operatively connected via the joint drive shaft.

* * * * *